United States Patent

Markman

[11] 3,991,490
[45] Nov. 16, 1976

[54] TEACHING AID FOR SIGMOIDOSCOPE AND THE LIKE

[76] Inventor: H. David Markman, 56 Marshall Road, Yonkers, N.Y. 10705

[22] Filed: Apr. 9, 1973

[21] Appl. No.: 349,202

[52] U.S. Cl. .................................................. 35/17
[51] Int. Cl.² ........................................ G09B 23/30
[58] Field of Search .................... 35/1, 17; 138/134

[56] References Cited
UNITED STATES PATENTS

| 325,591 | 9/1885 | Coultaus | 138/134 |
|---|---|---|---|
| 2,781,611 | 2/1957 | Bills | 35/17 X |
| 3,309,791 | 3/1967 | Kelley | 35/1 |
| 3,722,108 | 3/1973 | Chase | 35/17 |

*Primary Examiner*—Harland S. Skogquist
*Attorney, Agent, or Firm*—Bauer, Amer & King

[57] ABSTRACT

The teaching device or aid hereof includes a simulated, flexible bowel which is attached to a manikin having an interposed, masking position between learning and teaching participants using the aid, so that the teaching participant can selectively flex the simulated bowel, out of the view of the learning participant, preparatory to and during the attempt by said learning participant to properly pass the sigmoidoscope within said simulated bowel, as would be required during an examination of a living person.

The inventive device hereof is only illustratively described in connection with a sigmoidoscope, it being understood that it can also be used in teaching proper handling techniques with other medical instruments, e.g. a bronchoscope, a peritoneoscope, etc.

1 Claim, 4 Drawing Figures

U.S. Patent   Nov. 16, 1976   3,991,490
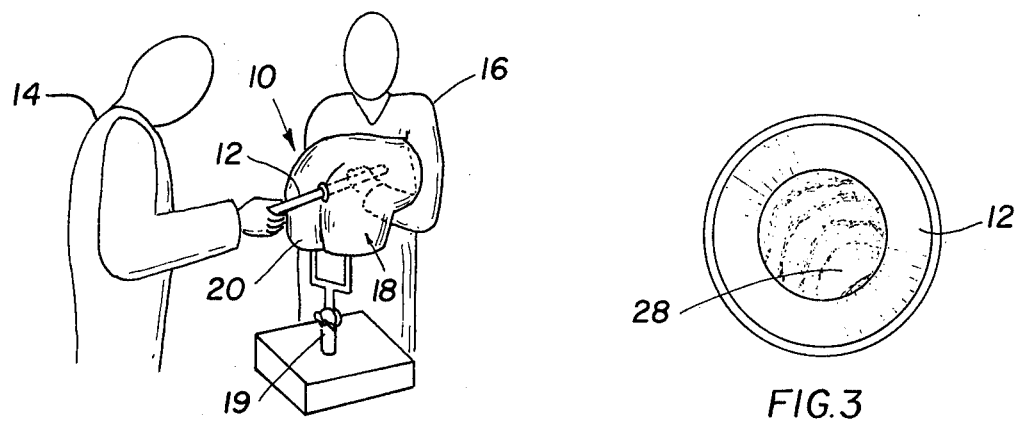
FIG.1
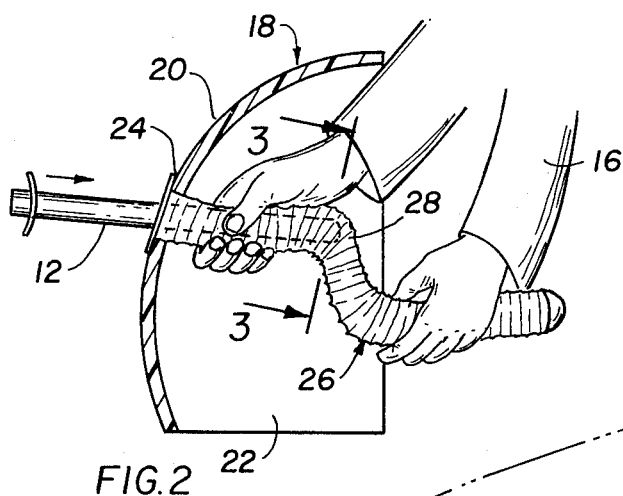
FIG.3
FIG.2
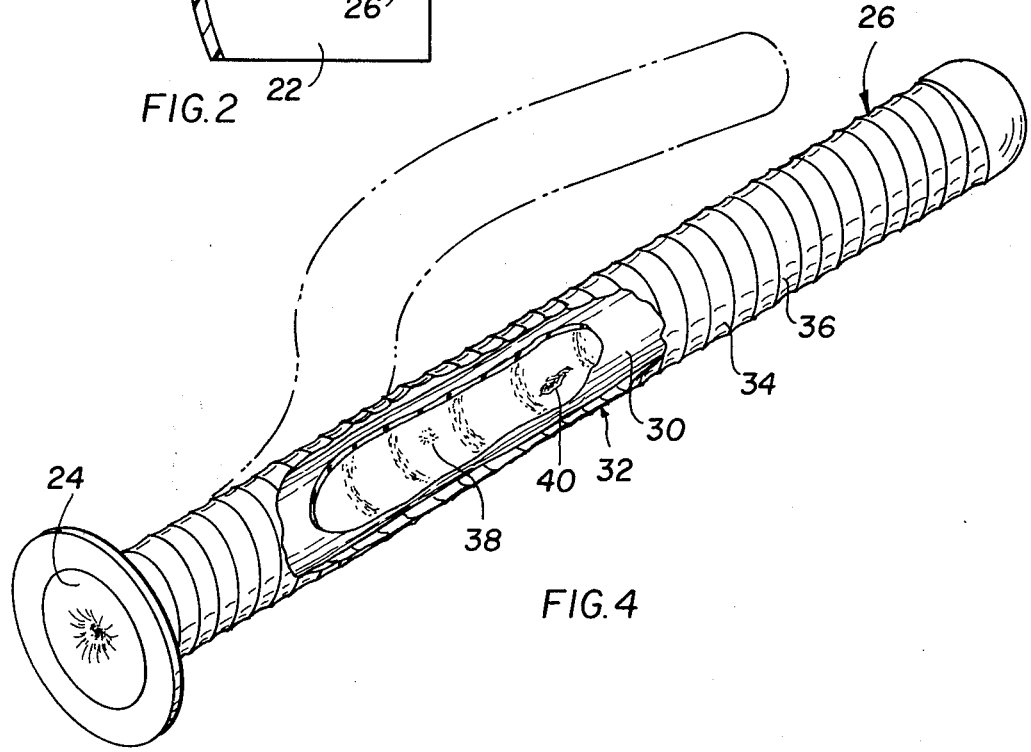
FIG.4

TEACHING AID FOR SIGMOIDOSCOPE AND THE LIKE

The present invention relates generally to an improved teaching or instructional device for contributing to the proper handling and positioning of medical examination instruments, e.g. a proctosigmoidoscope and the like, and more particularly to a teaching aid for a sigmoidoscope or similar internal-positioned instrument which demands, through active participation during use, adequate response to the variety of anatomical conditions encountered in living persons.

Known teaching devices or aids for instructing student doctors on the proper use of a sigmoidoscope, a bronchoscope, etc., all characteristically use a manikin simulating the appropriate part of the anatomy to be examined by the examination instrument or scope. These devices, also characteristically, are arranged to test the ability of the student to cope with a specific, static condition, which in most devices cannot be changed or modified. Where provision is made for change and modification, it is difficult to implement and, in any event, it is not of a significant extent or range to contribute to the learning experience of the students. Thus, after but limited use, the typical, static prior art teaching manikin is of questionable teaching value.

Broadly, it is an object of the present invention to provide an improved teaching aid for a sigmoidoscope or other internal-positioned examination instrument overcoming the foregoing and other shortcomings of the prior art. Specifically, it is an object to provide a teaching aid capable of an unlimited presentation of simulated anatomical patient-conditions, as selected by a teaching participant and to be coped with by a learning participant during the active participation of both in a typical use of the device hereof. Also, not only is the student required to respond to the selected anatomical environment, but the instructor is acutely made aware, in a noteworthy manner, of the manifestation of said student response, such as even the degree of pressure applied by the student in attempting to position the instrument.

A sigmoidoscope or similar examination instrument teaching device or aid demonstrating objects and advantages of the present invention employs, in combination, a flexible member simulating the examination area, e.g. a tubular simulated bowel, and an appropriate manikin supporting said simulated bowel or the like and having an operative interposed position between the learning and teaching participants. In practice, the teacher holds the simulated bowel in any selected twisted configuration while the student attempts proper placement of the sigmoidoscope therein.

The above brief description, as well as further objects, features and advantages of the present invention, will be more fully appreciated by reference to the following detailed description of a presently preferred, but nonetheless illustrative embodiment in accordance with the present invention, when taken in conjunction with the accompanying drawings, wherein:

FIG. 1 is a perspective view illustrating a typical use of the teaching aid hereof;

FIG. 2 is a side elevational view in section, illustrating further structural details of the teaching aid and also the typical manner in which the same is used to contribute to the learning experience in placing a sigmoidoscope;

FIG. 3 is an enlarged scale view, in section taken on line 3—3 of FIG. 2, illustrating typical simulated anatomical subject matter as viewed through the sigmoidoscope; and FIG. 4 is an isolated perspective view of the simulated bowel, portions of which are broken away to illustrate structural features thereof.

Reference is now made to the drawings wherein the teaching aid hereof, generally designated 10, is illustrated during a contemplated typical teaching session in relation to the proper handling and placement of a sigmoidoscope 12. It will be understood, however, that the teaching device 10 hereof can readily also be used to teach the placement and manipulation of a coloscope, and possibly other medical instruments which are used for internal examination of living persons. For example, it is also useful in teaching internal placement of a bronchoscope or gastroscope, or the like. Thus, the references to a sigmoidoscope and to a simulated bowel herein are intended as exemplary only of an advantageous use of said teaching aid 10, and are not to be understood as restricting the scope thereof.

It will furthermore be understood that the invention is not intended to be restricted to the illustrated structural features of the teaching aid 10 hereof. Rather, an important contribution of the invention resides in the manner in which the device 10 permits active participation, during a typical interval of use, between a learning participant 14 and a teaching participant 16 in connection with the proper internal placement of a medical instrument, such as the previously noted sigmoidoscope 12. Thus, the construction of device 10 is secondary to the aforesaid active participation which it promotes.

Other known teaching devices are characteristically restricted to the anatomical environment which they can simulate and are thus correspondingly restrictive in the degree to which they can test and challenge the ability of the student attempting to learn proper internal placement of the medical instrument.

As is perhaps best illustrated in FIG. 2, the teaching device or aid 10 includes a manikin body 18 mounted for universal movement into any selected position of movement on a conventional universal mount 19. The outer surface 20 of the manikin 18 is properly shaped and flesh-colored to simulate the human buttock, and this surface is presented in facing relation to the learning participant 14. As illustrated in FIG. 2, the configuration of the manikin 18 is such that it bounds a rearwardly facing compartment 22 which is in facing relation to the teaching participant 16. Appropriately connected, as at location 24 which will be understood to coincide with the location of the anus, is a simulated bowel 26, the free end of which extends into the compartment 22 and is thus substantially masked from the view of the participant 14 situated on the remote side of the manikin 18. Thus, the teaching participant 16 can grip the simulated bowel 26 and manipulate the same into any desired configuration, such as the exemplary illustrated configuration which includes a change in direction, as at 28, without this being disclosed or made known to the learning participant 14.

In accordance with the present invention, the aforesaid manipulation by the teacher 16 is done preparatory to and during an attempt by the learning participant 14 to place the sigmoidoscope 12 within the simulated bowel 26. As a result, during such placement, participant 14 is required to observe the change in direction at 28, as seen through the sigmoidoscope 12 (see, in particular, FIG. 3), and thus manipulate the distal end of the sigmoidoscope through the change of direction 28, just as he would be required to do during placement of a sigmoidoscope in a living person.

From the foregoing, it should be readily appreciated that any selected configuration can be provided to the simulated bowel 26 by the teaching participant 16 to test not only the dexterity, but also the judgment of the learning participant 14. For example, although not shown, the simulated bowel 26 can be manipulated through a severe bend or curvature change that cannot be passed, such as is typically found in a female that has had a hysterectomy, and thus prompt and require the recognition of this by the participant 14 who should, upon encountering this situation, terminate the examination. An intestinal obstruction resulting from other causes should also be recognized and requires termination of the examination.

As is perhaps best illustrated in FIG. 4, a preferred construction of the simulated bowel 26 includes a pair of telescoped inner and outer tubes 30 and 32 respectively. Outer tube 32 can consist of a construction which is currently popular for vacuum cleaner hoses, namely a plastic tube 34 reinforced with a helical wire 36, the latter contributing structural strength without inhibiting or interfering with flexuring of the simulated bowel 26, i.e. from the straight, full line illustrated condition into any undulating configuration, as exemplified by the phantom line perspective.

Inner tubular member 30 is fabricated of an appropriate plastic having a reddish bowel-simulating color. In accordance with the present invention, there is advantageously placed along the inner surface of the tube 30 markings 38, 40, which in size and color effectively simulate lesions that are encountered during a sigmoidoscope examination.

From the foregoing, it should be readily appreciated that there has been described herein a medical teaching aid, exemplified by device 10, which in sharp contrast to known teaching aids and devices is effective in promoting active participation between learning and teaching participants during instruction in the proper techniques for making internal placement of a medical instrument, such as those referred to herein. It should also be apparent that the simulated bowel 26 or the like can be placed into a selected configuration other than by the teaching participant, as for example by a holding construction designed for this purpose, e.g. Velcro or other cooperating fasteners. The use of such holding means is particularly recommended for use when giving instruction in the handling and placement of a coloscope. In such circumstances, the noteworthy contribution of the teaching device resides in the infinite range of possibilities of the selected configuration of the simulated bowel, and is in sharp contrast to the limited range of possibilities characteristic of known teaching aids and devices.

A latitude of modification, change and substitution is intended in the foregoing disclosure, and in some instances some features of the invention will be employed without a corresponding use of other features. Accordingly, it is appropriate that the appended claims be construed broadly and in a manner consistent with the spirit and scope of the invention herein.

What is claimed is:

1. An aid for teaching the placement of a sigmoidoscope and the like comprising a manikin presenting an outer surface in facing relation to a learning participant and bounding a rearwardly facing teaching compartment in facing relation to a teaching participant, a flexible simulated bowel and the like operatively connected to extend supported only at one end from said manikin into said teaching compartment so as to be substantially masked from the view of said learning participant by said manikin and in limp condition requiring support in the length portion within said teaching compartment, wherein said flexible simulated bowel comprises a pair of telescoped tubular members, the inner member thereof having simulated lesions therealong and the outer tubular member including a helical wire to contribute structural strength thereto without inhibiting the flexuring of said simulated bowel, and a teaching relation operatively established between said teaching and said learning participants by the support of said simulated bowel in a selected configuration in the hands of said teaching participant, whereby the efficacy and progress of said learning participant in the placement of a sigmoidoscope in said simulated bowel is conveyed by feelings communicated to said teaching participant.

* * * * *